(12) United States Patent
Hill

(10) Patent No.: US 7,322,780 B2
(45) Date of Patent: Jan. 29, 2008

(54) TIE-DOWN WRAP DEVICE FOR SECURING ARTICLES FOR SHIPMENT

(76) Inventor: Jerry R. Hill, 24559 S. Klingville Rd., Chassell, MI (US) 49916

( * ) Notice: Subject to any disclaimer, the term of this patent is extended or adjusted under 35 U.S.C. 154(b) by 86 days.

(21) Appl. No.: 11/355,367

(22) Filed: Feb. 17, 2006

(65) Prior Publication Data

US 2007/0196193 A1    Aug. 23, 2007

(51) Int. Cl.
*B60P 7/08* (2006.01)
(52) U.S. Cl. .............................. 410/97; 410/7; 410/23
(58) Field of Classification Search ................. 410/4, 410/7, 10–12, 23, 97, 100; 24/265 CD, 16 R, 24/306, 442; 248/499
See application file for complete search history.

(56) References Cited

U.S. PATENT DOCUMENTS

| | | | |
|---|---|---|---|
| 63,510 | A | 4/1867 | Hall |
| 487,145 | A | 11/1892 | Gibbons |
| 2,971,231 | A | 2/1961 | Stoddard |
| 3,279,008 | A | 10/1966 | Wallach |
| 3,965,539 | A | 6/1976 | Golden |
| 4,431,226 | A | 2/1984 | Weilert |
| 5,014,890 | A | 5/1991 | Perry |
| 5,075,933 | A | 12/1991 | Kemper |
| 5,177,986 | A | 1/1993 | Jensen |
| 5,603,591 | A * | 2/1997 | McLellan ................. 410/97 |
| 5,732,445 | A | 3/1998 | Stodolka |
| 5,774,948 | A | 7/1998 | Petschke et al. |
| 6,113,328 | A | 9/2000 | Claucherty |
| 6,183,178 | B1 | 2/2001 | Bateman |
| 6,199,412 | B1 | 3/2001 | Kennedy |
| 6,231,285 | B1 | 5/2001 | Elwell et al. |
| 6,244,800 | B1 | 6/2001 | Studanski |
| 6,256,844 | B1 | 7/2001 | Wheatley |

\* cited by examiner

*Primary Examiner*—Stephen Gordon
(74) *Attorney, Agent, or Firm*—James V. Harmon

(57) ABSTRACT

A wrap device that can be used for tying down articles which are to be shipped or to provide a secure connection to an article comprises a flexible sheet of strong base stock material such as leather, heavy canvas, rubber, plastic, etc. The base stock has a pair of ends and an opening or slot through it that is spaced apart from one end. In use, the stock material is wrapped around an article to be shipped or secured in place. An optional fastener assembly that is connected to the base stock includes a cooperating pair of fastener elements, e.g., Velcro® proximate the ends of the base stock for securing the ends of the base stock together when wrapped around the article that is being shipped. A rigid connector is provided on the base stock that has a metal loop with a central eye opening and a foot that is attached near one end of the base stock such that when the base stock is coiled around an article, the connector extends through the opening in the base stock with the loop projecting outwardly whereby tension exerted by a cord or other tie-down element passed through the eye of the connector tends to draw overlapping portions of the base stock into tight contact with one another to provide a secure overlap. The wrap device can therefore be held in a wrapped condition in two ways; by tension applied to the eye of the connector as well as by the fastener assembly to provide a secure connection.

15 Claims, 5 Drawing Sheets

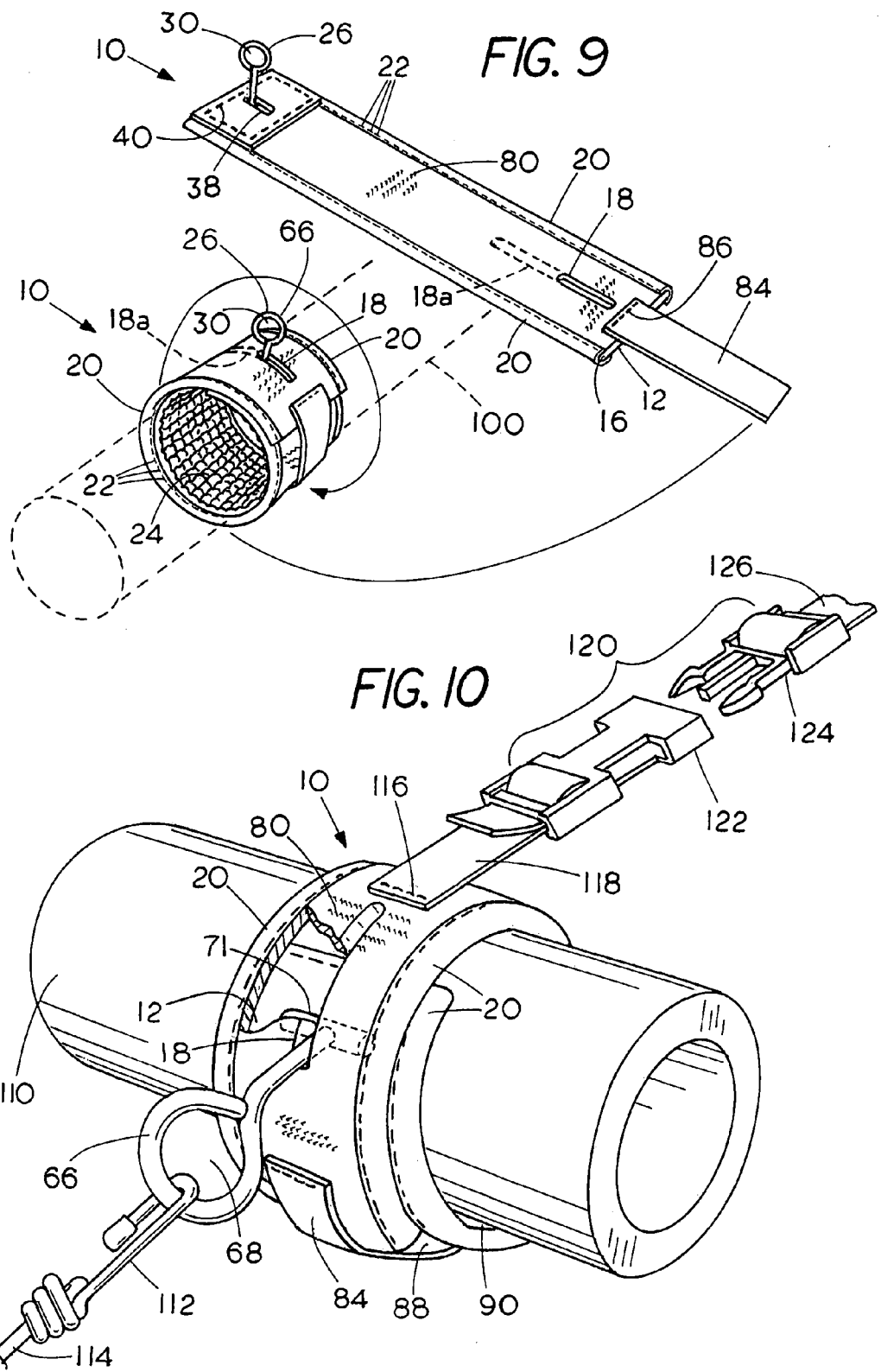

TIE-DOWN WRAP DEVICE FOR SECURING ARTICLES FOR SHIPMENT

FIELD OF THE INVENTION

This invention relates to retaining devices and particularly retaining devices that are useful for stabilizing articles for shipment and for connecting a cable, rope, chain, or strap to an article.

BACKGROUND OF THE INVENTION

While various retainers have been previously proposed, the prior devices are not suited for tying down a wide variety of articles that are to be shipped such as metal tubing, rod or pole stock, boards, or even vehicles such as motorcycles, bicycles, snowmobiles, all-terrain vehicles, and the like. The general objective of the present invention is to provide a retaining device which has wide application for supporting, stabilizing, or tying down articles and can be used both by shipping companies as well as by the consumer for tying down an article, e.g., in the bed of a pick-up truck or trailer that is hauled behind an automobile, SUV, or truck. In commercial use, the invention should be suited for tying down articles that are shipped by truck, train, flatbed, or semi-trailer, etc. The applicant is not aware of any tie-down wrap device that is well suited for wide application in such a variety of commercial or personal uses. Another problem of the prior art is a lack of a way to connect tie-down straps, cords, ropes, lines, chains, or other tie-down elements to a wrap. Yet another shortcoming is the lack of an effective provision for keeping a device securely wrapped around the article that is being shipped or for reliably holding overlapped portions of a wrap element in contact with one another to secure the article in place.

U.S. Pat. Nos. 2,971,231; 4,431,226; and 5,075,933, for example, describe various forms of retaining devices that are used for holding articles. Some of these devices have no provision for connecting a tie down strap to the unit. Others lack a feature for keeping a wrap tightly wound around the article, and none are suitable in a wide variety of different shipping applications for stabilizing articles being shipped by a consumer or commercially via truck, trailer, over-the-road freight, or by railroad car.

In view of these and other shortcomings of the prior art, it is one object of the present invention to provide an improved tie-down wrap device that is suited for a wide variety of applications including both commercial and consumer uses.

Another object of the invention is to provide a tie-down wrap device in which a cord, rope, cable, or other tie-down element that is connected to the wrap tends to draw overlapped portions of the device into contact with one another to help secure the article that is being shipped.

Another object of the invention is to provide a tie-down wrap device suited for wide-scale use which is rugged in construction, reliable in operation, can be produced at a low cost, and includes a provision for retaining the device in a wrapped condition around the article that is being shipped or connected securely to any other article such as a post, overhead beam, structural member, or other object.

These and other more detailed and specific objects of the present invention will be better understood by reference to the following Figures and detailed description which illustrate by way of example but a few of the various forms of the invention within the scope of the appended claims.

SUMMARY OF THE INVENTION

The invention provides a wrap device that can be used for tying down articles that are to be shipped or to provide a secure connection to an object. The tie-down wrap device includes a flexible sheet of strong base stock material such as leather, heavy canvas, rubber, plastic, or plastic impregnated textile or the like. The base stock has a pair of opposite ends and an opening or slot through it that is spaced apart from one end. During use, the stock material is wrapped around an article to be shipped or secured in a fixed position. An optional fastener assembly is connected to the base stock and includes a cooperating pair of fastener elements, e.g., a hook and loop fastener, proximate the ends of the base stock for securing the ends of the base stock together when wrapped around the article that is being shipped. A rigid connector comprising a loop with a central eye opening has a foot portion that is attached to one end of the base stock material such that during use the connector extends through the opening in the base stock with the loop projecting outwardly such that tension exerted by a cord or other tie-down element passed through the eye of the connector pulls the connector outwardly to apply tension through the opening on a subsurface lap of the base stock so as to draw overlapping portions of the wrap device into contact with one another and thereby keep the device tightly wrapped. The device is held thereby in a wrapped condition in two ways; by tension applied to the eye of the connector, as well as by the fastening device to provide a secure connection to the article being shipped or stabilized.

BRIEF DESCRIPTION OF THE DRAWINGS

FIG. 9 is a perspective view showing the invention in the process of being wrapped around an article that is to be shipped, and FIG. 10 is a perspective view showing another form the invention during use.

DESCRIPTION OF THE PREFERRED EMBODIMENTS

Figure 1:
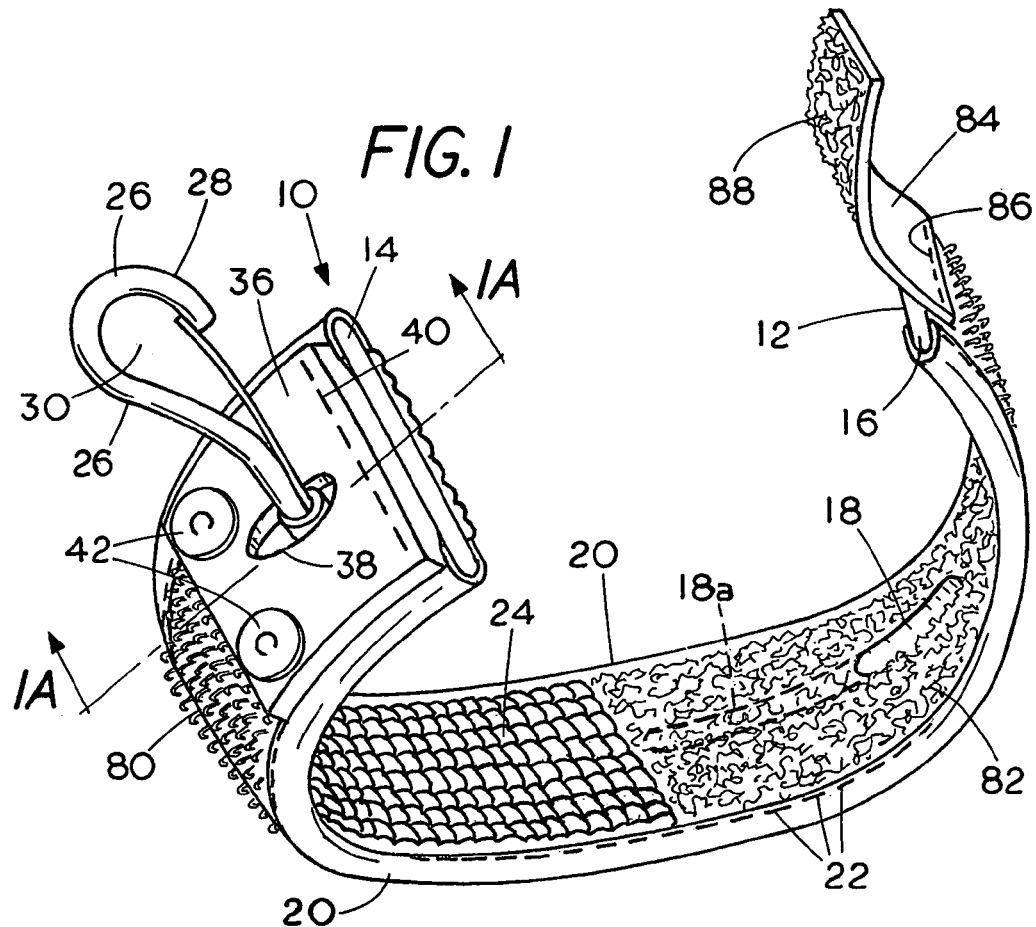
FIG. 1 is a perspective view of one preferred form of the invention.
Figure 2:
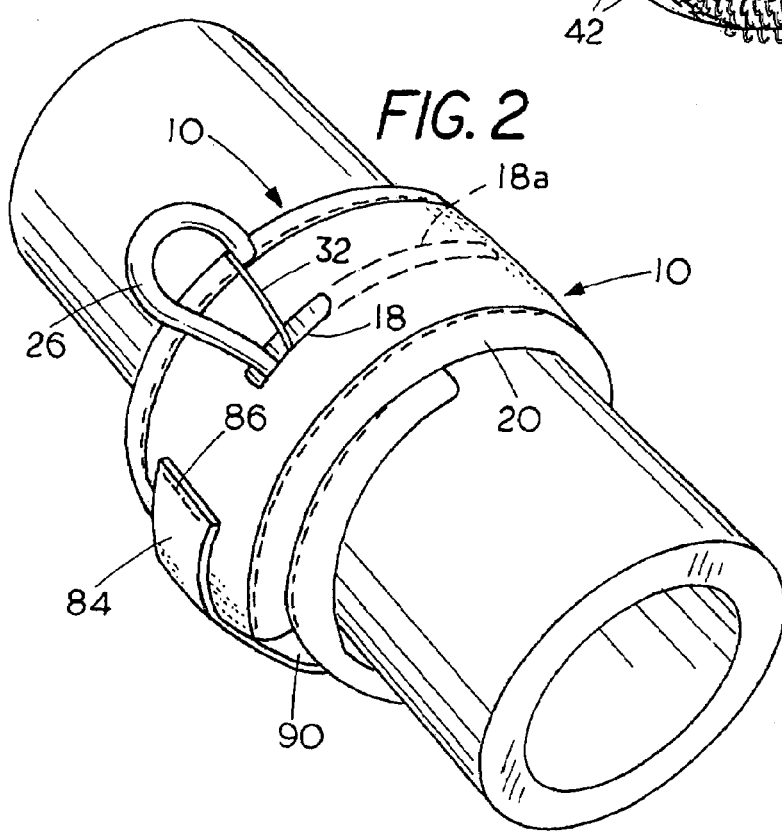
FIG. 2 is a perspective view showing the wrap device coiled around an article.

FIGS. 1-2 illustrate one embodiment of the invention comprising a wrap device 10 that includes a rectangular sheet of base stock material 12 having opposed ends 14 and 16. The flexible sheet of stock material 12 can be any of a wide variety of materials including leather, rubber, canvas, plastic impregnated canvas or other textile, plastic, or other strong material with sufficient flexibility to be wrapped around articles that are to be shipped. One suitable material is rubber stock of about ¼" in thickness. Stock 12 includes an opening or slot 18 that for many applications can be about 1" to 1½" in length and about ¼" in width. If desired, however, the slot 18 can be much longer and can extend axially toward the center of the wrap 10 as shown at 18*a*. Optionally, the base stock 12 is provided with strips of fabric or other flexible protective material, e.g., fabric strips along each side edge which form a selvage 20 that is held in place in any suitable manner, e.g., by stitching as shown at 22. Bonded to the inside surface of a portion of the stock material 12 is a sheet of non-slip padding 24. A rectangular section of sponge-like rubber padding 24 with a corrugated outer surface has proved very effective. It can be held in place in any suitable manner, e.g., by being bonded in place with an adhesive or thermally bonded to the base stock 12. The non-stick padding 24 is placed on the inside surface of the wrap device 10 where it will come in contact with the article that is being shipped or whatever the device 10 is wrapped around. The padding 24 serves two purposes; it prevents the wrap device 10 from slipping and also protects the finish of the product that is being shipped or enclosed by the wrap 10. If the base stock 12 is formed from soft rubber which will not damage an adjacent surface, the padding 24 can be eliminated.

Figure 8:
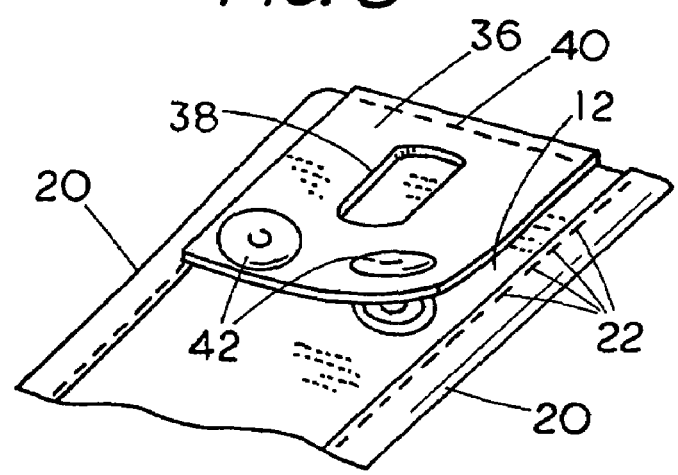
FIG. 8 is a partial perspective view showing how snaps can be used for fastening connector hardware in place on the wrap device.

At the left end of the device 10 is provided a hardware connector 26 which includes a loop 28 having a center eye opening 30. The connector hardware 26 in this case is a steel snap connector having a spring steel closure element 32. The foot of the connector 26 in this case is a steel plate 34 which is securely held in a pocket formed by a hardware anchor 36 comprising a square piece of leather or heavy woven web material with a hole 38 at its center. The anchor 36 is stitched in place at 40 and is secured at its inner end by means of a pair of snaps 42 in FIGS. 1 and 1A (see also FIG. 8) or, if desired, by a row of stitches 43 shown in FIG. 1B. To remove the connector hardware 26, the snaps 42 can be disconnected as shown in FIG. 8. A different form of connector hardware can then be installed in place of the connector 26. The snaps 42 enable the invention to be used with a variety of different connector hardware elements to simply unsnap the anchor 36 and insert the appropriate anchor hardware needed to then coil the wrap around the article being transported. This provides multiple uses, i.e., one could use an eye ring one day and the next day a pulley, snap ring, or other connector.

Figure 1A:
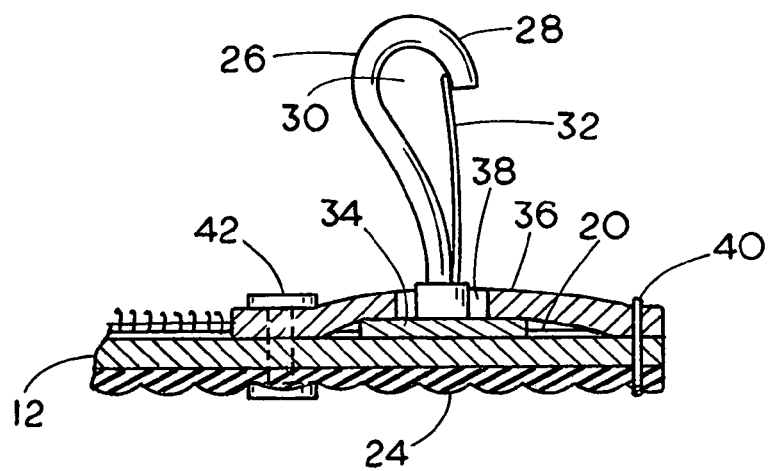
FIG. 1A is a vertical cross-sectional view taken on line 1A-1A of FIG. 1.
Figure 1B:
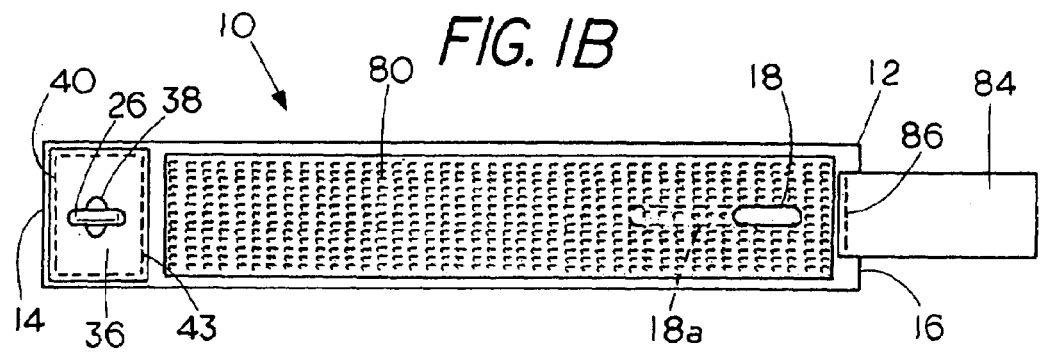
FIG. 1B is a plan view of the device shown in FIGS. 1 and 2.

The anchor material 36 is only shown connected on two sides in FIGS. 1, 1A, and 8, but for many applications is preferably fastened by stitching on all four sides as shown in FIG. 1B. If desired, the foot portion 34 of the connector hardware 26 can be fused or thermally bonded, that is to say secured by melting the stock material 12 to fuse it to the connecter hardware 26. Application requirements can be used to determine the best way to fasten connector hardware 26 to the base stock 12.

The opening 18 is designed to allow the hardware connector 26 to pass through the outer layer of the base stock 12. The opening 18 can be exactly the same size as the connector passing through it or of a larger size if desired. The opening 18 can be round or elongated if desired. The longer the opening 18 is made, the greater the variability in articles that can be effectively wrapped. It should be noted that the opening 18 will not reduce the strength of the invention because each side portion of the base stock 12 that overlaps the hardware anchor 36 firmly secures the connector hardware in place so as to prevent it from being pulled out of the anchor 36.

Figure 3:
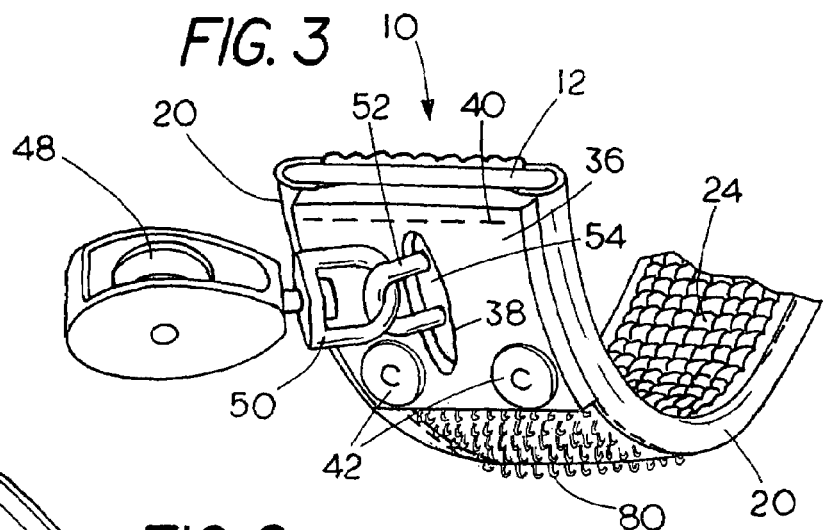
FIG. 3 is a partial perspective view showing a modified form of connector in accordance with the invention.

By reference to FIGS. 3-6, wherein the same numerals refer to corresponding parts already described, it will be seen that various forms of connectors can be used with different heads depending upon the intended use of the device. In FIG. 3, the connector device comprises a small pulley 48 connected by means of a ring 50 to a loop 52 having a foot plate 54 like the plate 34 of FIG. 1A which is held between the anchor 36 and the base stock 12 so that the loop 52 projects outwardly through the opening 18 in the outer layer of the stock 12.

Figure 4:
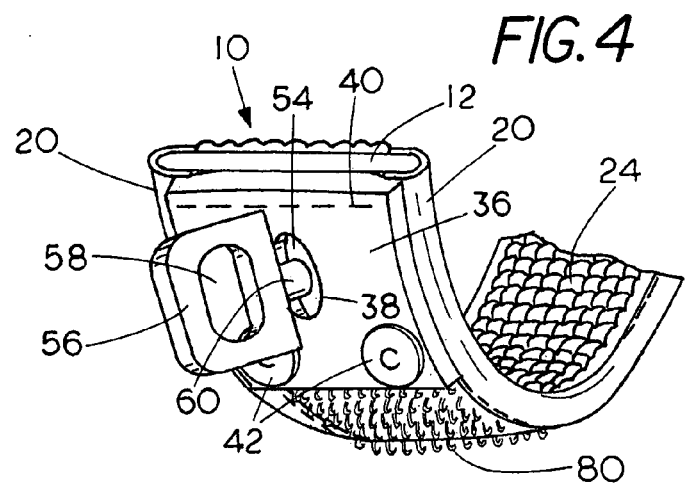
FIG. 4 is a partial perspective view similar to FIG. 3 showing a different form of connector.

In FIG. 4 the connector hardware comprises a swivel 56 having a central eye opening 58. The swivel 56 can be turned so as to move vertically, horizontally, or any position in between as desired. The plate 56 includes an integral stem 60 which is welded to a rotatable footplate 54.

Figure 5:
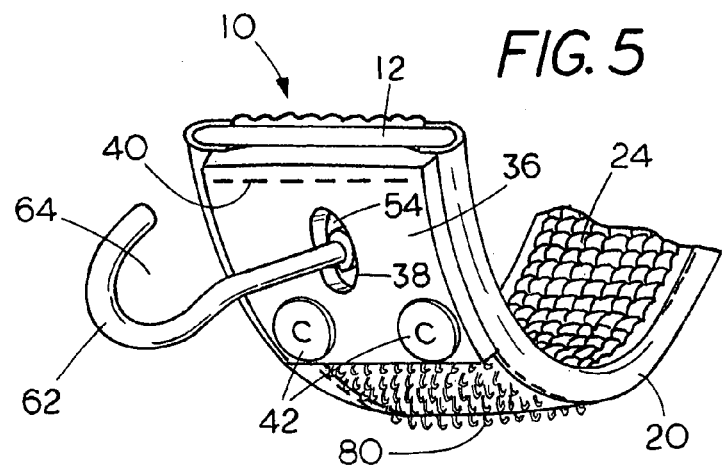
FIG. 5 is a perspective view similar to FIG. 3 showing a different form of connector.

In FIG. 5 the connector comprises a claw-shaped hook 62 with a central eye opening 64. The lower end of hook 62 is welded or otherwise securely bonded to the footplate 54 beneath the anchor 36.

Figure 6:
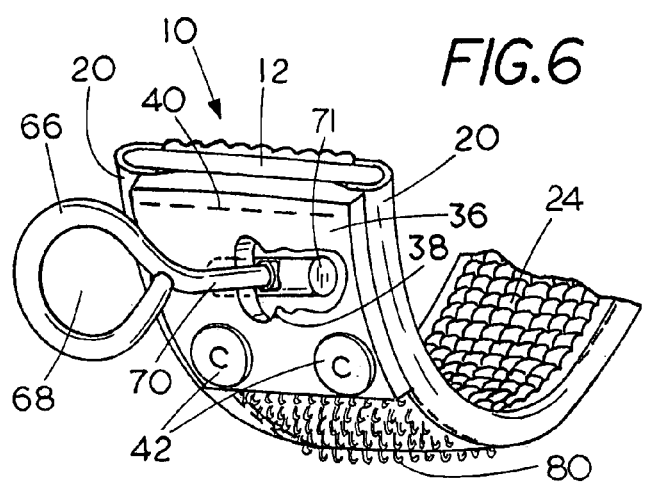
FIG. 6 is a perspective view similar to FIG. 3 partially broken away showing a different form of connector.

Another form of connector hardware is shown in FIG. 6, in this case an eye ring 66 having a central eye opening 68 and stem 70 which is welded at right angles to a short section of rod stock 71 to enable the ring 66 to pivot within the opening 38. The anchor hardware ring 66 is thus provided with a T-fitting at the foot end. Other forms of foot members such as an oval shaped piece of sheet metal can be welded to the stem 70 if desired. In an alternative form, the connector hardware 26, 48, 56, 62, or 66 can, if desired, be stamped from a single piece of metal to form a one-piece connector.

Refer again to FIGS. 1-1B for a description of an optional fastener assembly 80 and 82. The fastener assembly, in this case a hook and loop fastener, e.g. Velcro®, comprises two fastener elements on opposite sides of the base stock including a section of hook material 80 that is adjacent the connector hardware 26 on the outside surface of the wrap 10 and a cooperating layer of loop material 82 at least between opening 18 and end 16 on an inner surface of the wrap which faces the material 80 during use and is bonded to it by the hook and loop connector. The hook and loop material can be fastened by adhesive or stitching to the base stock 12. Also provided as a part of the optional fastener assembly is a fastener band 84 of strong fabric which is sewn to the end 16 of the base stock 12 by stitching 86 and is provided with loop fastener material 88 on its lower, i.e., inner surface as shown in FIG. 1. During use, as shown in FIG. 2, the fastener band 84 which extends beyond the end 16 of the base stock 12 is bonded by a hook and loop connection to the outer surface of the hook material 80 on an adjacent inner coil of the wrap 10 as shown at 90 in FIG. 2. The term "fastener assembly" in the present application is used broadly to include a variety of well known fasteners such as a snap fastener, zipper, buckles, toggle connector, tie strings, or other forms of fastener assemblies known in the art, as well as the hook and loop fasteners shown. A quick-releasing fastener assembly such as a hook and loop fastener is however preferred because of its convenience and its ability to bond in different positions so as to permit encircling articles of different sizes.

Figure 7:
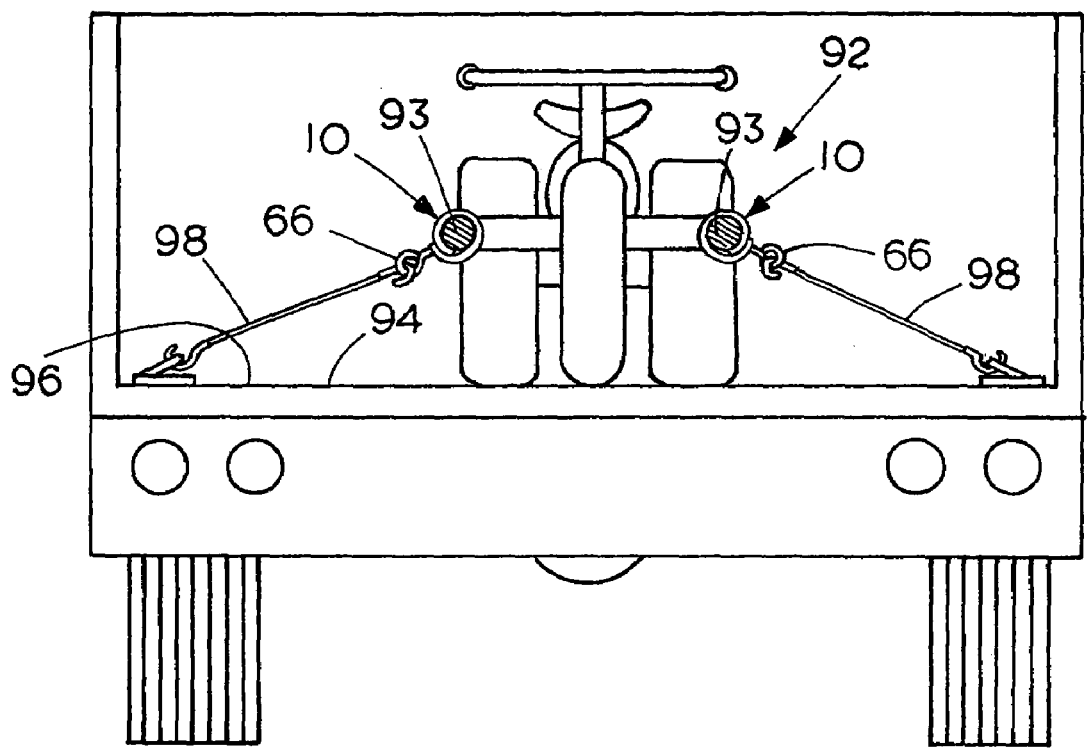
FIG. 7 is a semi-diagrammatic rear elevational view showing the invention in use for securing an article in the bed of a truck.

Refer now to FIG. 7 which illustrates the invention in use for securing an article, in this case an all-terrain vehicle 92, to the bed 94 of a truck 96, or other vehicle. The wrap devices 10 are each wound around one of the frame elements 93 of the vehicle 92 and held in place by the fastener assemblies 80-88 which cannot be seen in FIG. 7. The hardware ring 66 on each side of the all-terrain vehicle 92, each with an eye opening at the center, are connected to an elongated tie-down element such as a bungee cord 98. The rings 66 are positioned to extend outwardly through the openings 18 as already described and in this case are positioned to project downwardly at about a 40 angle to the horizontal. Each bungee cord 98 is connected at its lower ends to the truck bed 96. The invention has many other applications, for example, for connecting articles to the luggage rack of a vehicle.

In FIG. 9 the invention is shown with the wrap device 10 coiled around a cylindrical article 100 such as a steel rod, tube, or post. The invention can be used to encircle articles of various cross-sectional shapes, including square, rectangular, triangular, etc.

Refer now to FIG. 10 in which the same numerals refer to corresponding parts already described showing the wrap device 10 coiled around a cylindrical section of pipe 110 held in place by the fastener assembly 80-88 as already described. In FIG. 10 only the fastener band 84 bonded at 90 to an underlying lap of the base stock 12 can be seen. The connector hardware 66 in this case is fastened to a hook 112 of a bungee cord 114, the other end of which (not shown) is secured to a truck bed or other foundation. Fastened, e.g., by stitching at 116 adjacent opening 18 is a fastener strap 118 preferably provided with a conventional bayonet connector 120 which includes mating components 122 and 124 of suitable known construction. The connector 120 is fastened to a strap 126, only a part of which is shown that is connected at its other end to a supporting surface such as a sidewall of a truck bed or other stable foundation. The connector assembly 120 thus provides an adjustable strap that can be used instead of straps or cords to anchor the wrap device 10 to a vehicle or other object.

From the foregoing description, it will be seen that the coils of the wrap 10 are held simultaneously in two ways. First, by the connector hardware, e.g., 66 in FIG. 10 which enables the tension provided by the cord 114 or other tie down element to pull connector 66 outwardly and apply tension through the opening 18 on a subsurface lap of the base stock 12 so as to draw overlapped portions of the device into tight contact with one another to maintain a secure hold on the article 110. At the same time, the fastener assembly 80, 82 comprising the hook and loop fastener keeps the coils of the wrap device 10 in tight contact. The wrap 10 is thus secured in a wrapped position in two different ways simultaneously. The fastening band 84 helps to keep the outer coil of the wrap 10 from pulling up and possibly tearing away from the subsurface lap to further strengthen to the device.

The invention assures that the ends of the wrap device 10 cannot separate because even if the ends begin to come apart from one another, once the separation reaches the connector hardware 26, 48, 56, 62, 66, etc., the connector hardware will prevent the separation from proceeding further. Consequently, for some applications the fastener assembly 80-88 may be omitted if desired.

In addition to stabilizing articles that are being shipped, the invention can be used whenever a rope or cable, etc., is to be connected to an object, e.g. for connecting a cable to a tree or to an overhead beam in a building. Many other uses will be apparent from the present disclosure.

Many other variations of the present invention within the scope of the appended claims will be apparent to those skilled in the art once the principles described herein are understood.

What is claimed is:

1. A tie-down wrap device comprising, a flexible sheet of strong base stock material having a first end and an opening through the base stock material that is spaced from the first end, said base stock being adapted to be wrapped around an article to be shipped or secured in place, a connector comprising a loop with a central eye opening and a foot portion that is attached to the first end of the base stock material such that during use the connector extends through the opening in the base stock material with the loop projecting outwardly therefrom whereby tension exerted by a cord or other tie-down element that is passed through the eye opening of the loop pulls the connector outwardly so as to apply tension through the opening upon a subsurface lap of the base stock material and thereby draw overlapped portions of the device into tight contact with one another.

2. The device of claim 1 including a fastener assembly comprising a first fastener element proximate the first end of the base stock material and a second fastener element on an opposite surface thereof proximate a second end of the base stock material with the opening located centrally of the second fastener element and the fastener elements are connectable to one another for securing the ends of the base stock material together when wrapped around the article that is being shipped.

3. The device of claim 2 wherein the fastener assembly comprises a hook and loop fastener in which one of said fastener elements comprises hook elements and the other fastener element comprises loop elements.

4. The device of claim 1 including a resilient pad element attached to an inner surface of the base stock material for being placed in contact with the article to cushion the article.

5. The device of claim 1 wherein the connector comprises a metal loop with a stem having the foot portion at a lower end thereof, a sheet of anchor material having a hole therein is secured to an outer surface of the base stock material with the stem of the connector passing through the hole in the anchor material.

6. The device of claim 1 that includes a fastening strap connected to the base stock material and extending outwardly therefrom for connecting the wrap device to an object.

7. The device of claim 1 wherein the foot portion of the connector comprises a metal plate.

8. The device of claim 1 wherein the foot portion comprises a rod at right angles to the connector to provide a T structure at the lower end thereof for enabling the connector to pivot with respect to the base stock material.

9. The device of claim 2 including a fastening strap element connected to the base stock material and extending outwardly therefrom for connecting the wrap device to an object.

10. The device of claim 9 wherein the foot portion comprises a rod at right angles to the connector to provide a T structure at the lower end thereof for enabling the connector to pivot with respect to the base stock material.

11. The device of claim 1 including at least one elongated tie-down element secured to the connector loop at one end and adapted to be secured to a foundation element at another end.

12. The device of claim 6 including an elongated tie element secured to the loop of the connector such that the wrap device is adapted to be secured by at least a pair of elongated elements.

13. The device of claim 2 wherein the fastener assembly includes a band of strap material having a hook or loop fastener thereon for securing an outer coil of the wrap device to an underlying layer thereof.

14. The device of claim 1 wherein the connector is removably connected to the base stock material.

15. The device of claim 1 including a strap, cord, chain, or cable connected to the loop of the connector for attaching the device to an object by applying tension to the connector.

* * * * *